United States Patent [19]

Cornelius

[11] 3,976,093
[45] Aug. 24, 1976

[54] PIPE COUPLING APPARATUS
[75] Inventor: Gail Cornelius, Portland, Oreg.
[73] Assignee: R. M. Wade & Co., Portland, Oreg.
[22] Filed: June 21, 1974
[21] Appl. No.: 481,488

[52] U.S. Cl. .............................. 137/344; 285/363
[51] Int. Cl.² .................. A01G 25/02; B05B 15/06
[58] Field of Search ............... 285/5, 27, 110, 330, 285/363, 369, 379, DIG. 14; 137/344; 239/212

[56] References Cited
UNITED STATES PATENTS

| 2,475,057 | 7/1949 | Shaber .................................. 285/27 |
| 2,517,391 | 8/1950 | Ernestus ...................... 285/DIG. 14 |
| 2,766,996 | 10/1956 | Jacoby .................................... 285/5 |
| 3,211,382 | 10/1965 | Cornelius et al .................... 239/212 |
| 3,312,236 | 4/1967 | Stewart .............................. 137/344 |
| 3,848,421 | 11/1974 | O'Brien et al. ................. 285/363 X |

Primary Examiner—Henry T. Klinksiek
Attorney, Agent, or Firm—Phillips, Moore, Weissenberger, Lempio & Strabala

[57] ABSTRACT

Disclosed herein are coupling means for joining the ends of a pair of pipes, such coupling means including circular flanges associated with the pipes, and defining pluralities of teeth which engage when the flanges are brought together. One of the pipes includes an extended portion which extends into the end of the other pipe with the flanges so positioned, and an annular seal is disposed about the extended portion and within the other pipe. Means are included for releasably securing the flanges together to provide coupling of the pipes.

8 Claims, 9 Drawing Figures

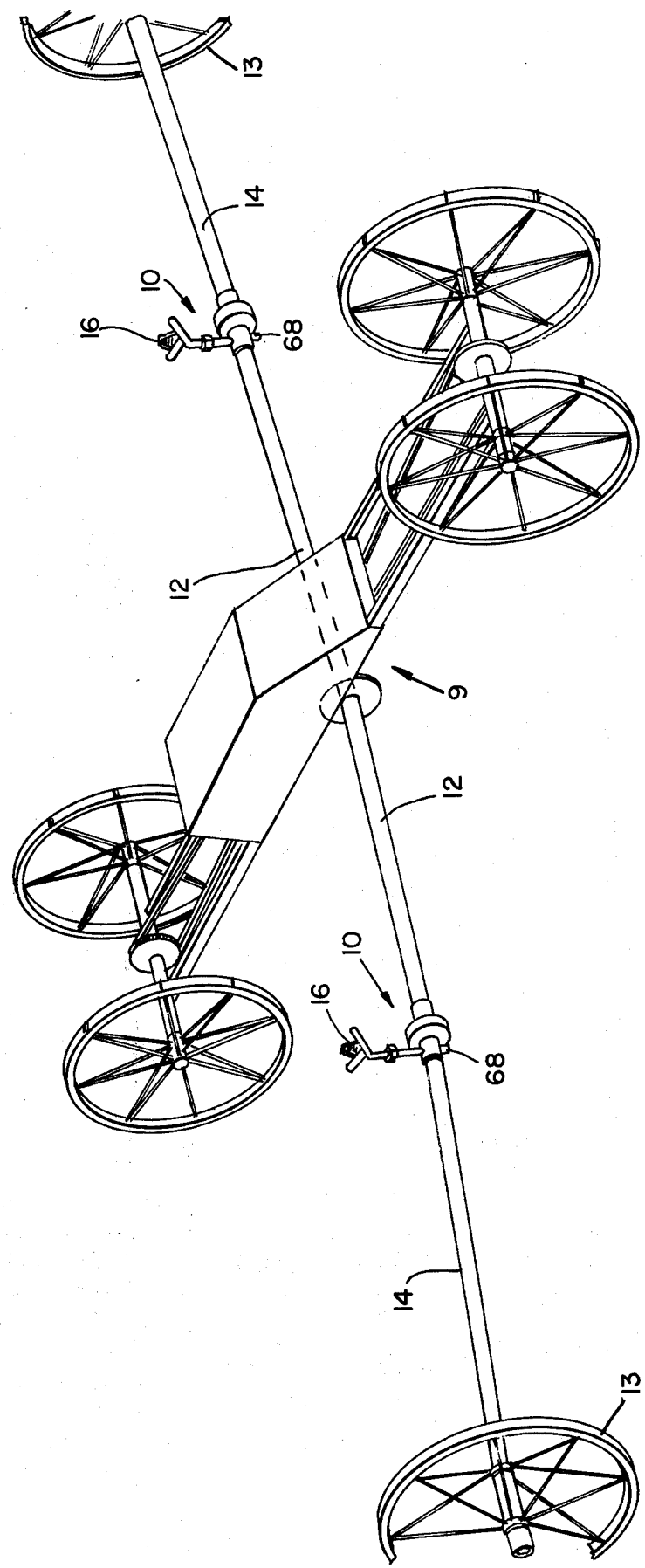
FIG_1

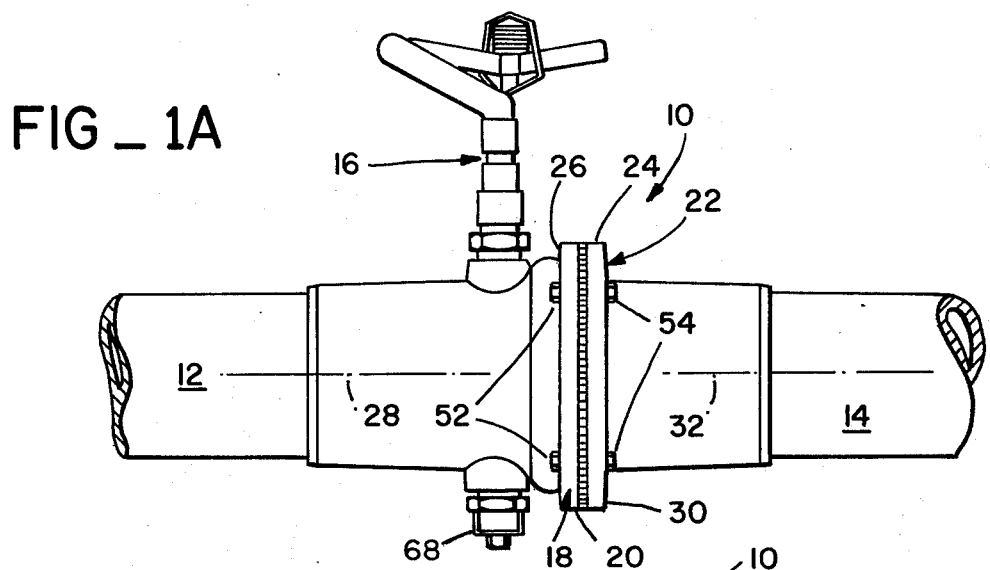
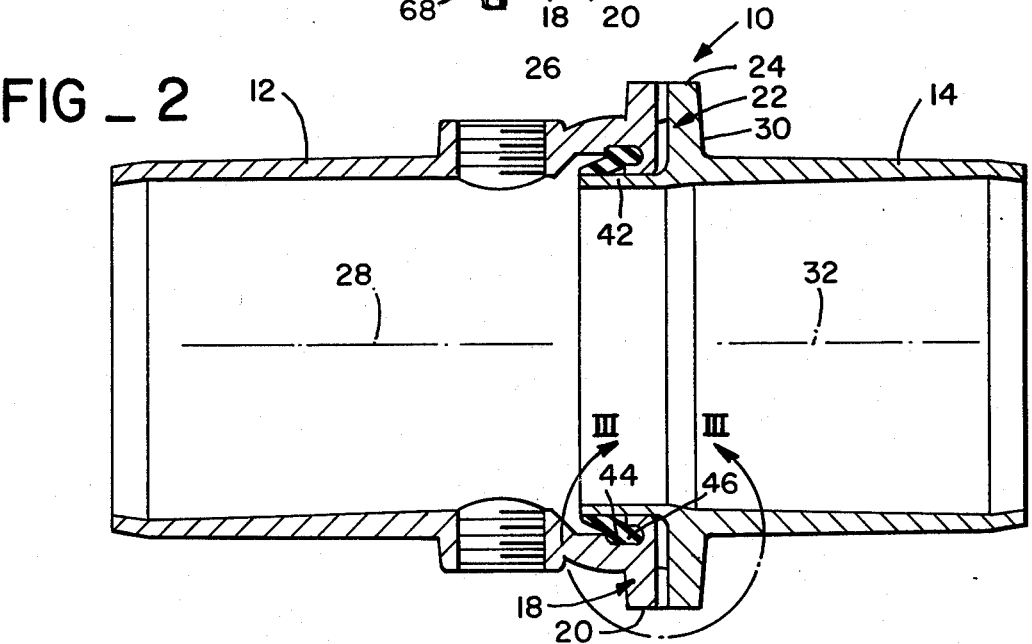
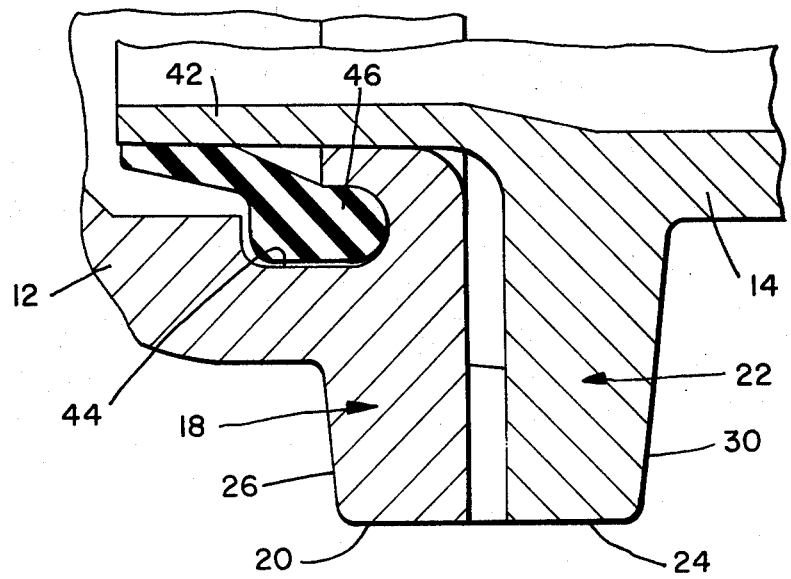

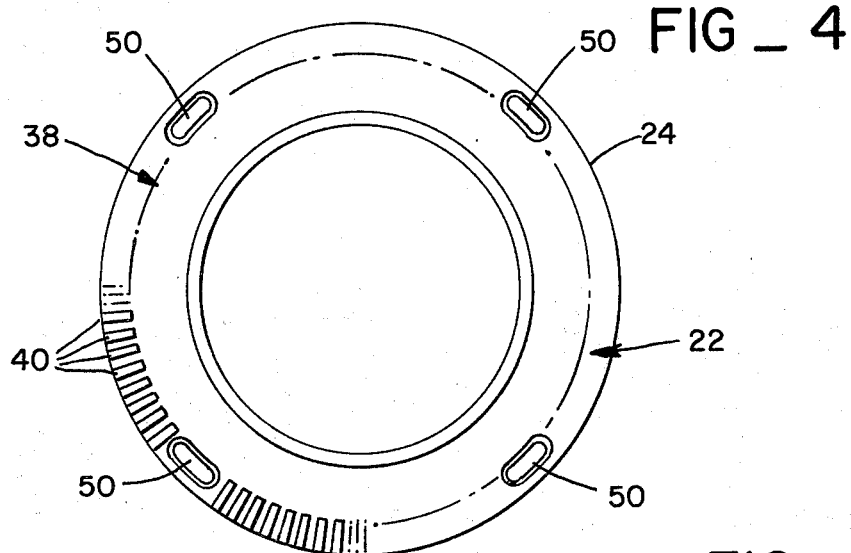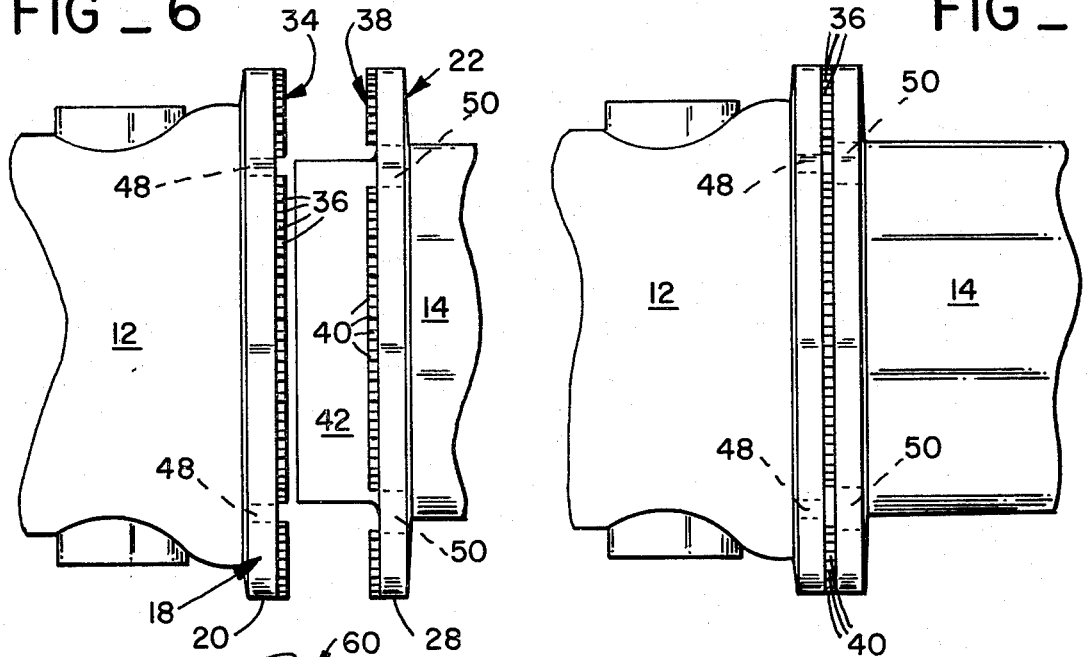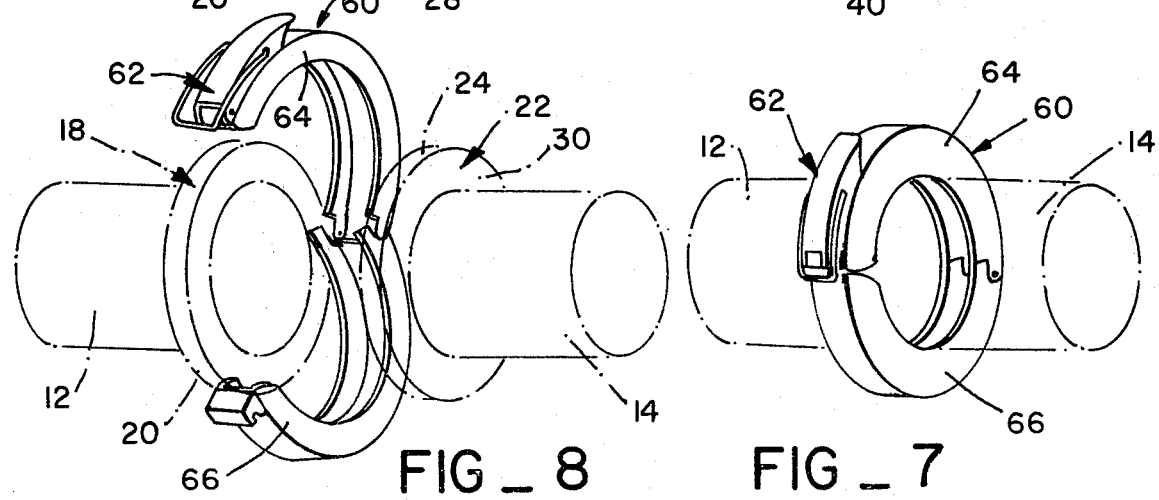

PIPE COUPLING APPARATUS

BACKGROUND OF THE INVENTION

This invention relates to pipe coupling means, and more particularly, to pipe coupling means of the type which utilize a male-female type connection and seal means disposed therebetween.

One system for irrigating land utilizes a selectively drivable wheeled mover unit. An elongated irrigation line, made up of a plurality of pipe sections connected end to end by coupling means, is positioned transversely of and associated with the mover unit. The irrigation line is also supported along its overall length at spaced intervals by wheels fixed thereto.

Generally, the irrigation line has secured thereto a plurality of sprinkler nozzles, which are properly placed relative to the irrigation line so that each is initially positioned substantially upright. Water passing through the line exits from such sprinkler nozzles to properly irrigate an area of land. Upon completion of such irrigation of that area, the mover unit is actuated and moved to another area of land. The line is associated with the mover unit in such a manner as to act as a driving axle which rotates the wheels supporting it along its length. The irrigation line rotates as a unit so that the mover unit may be stopped in a chosen position to in turn position the nozzles against substantially upright. This area of land is now irrigated in the manner previously described.

Coupling means used to couple such pipes end to end, it will be seen, are subjected to a relatively great torque during such operation, since the irrigation line acts as a driving axle as described above. Thus, such coupling means must be capable of properly operating when subjected to such torque. Additionally, the coupling means should enable the pipe sections to be easily and quickly attached and detached from the couplings which join them. The coupling means joining any pair of pipes should, of course, provide an effective fluid-tight joint, in addition to the above-mentioned attachment and detachment feature. Consequently, the coupling means should be particularly designed with these features in mind. Additionally, the coupling means should be capable of effective coupling even though a degree of linear or rotational misalignment between the pipes exists. And, such coupling means should be capable of positionally securing one pipe relative to another when in use.

A common type of pipe coupling includes an annular seal disposed between adjacent radial surfaces of the pipe sections to be coupled. Such a system does not generally allow for a degree of linear or rotational misalignment between the pipe members, nor is such system capable of providing highly efficient sealing when the irrigation pipe is rotated to subject the coupling to a rotational torque.

SUMMARY OF THE INVENTION

It is accordingly an object of this invention to provide coupling means for joining a pair of tubular pipes which allows for easy and quick attachment and detachment of such pipes.

It is a further object of this invention to provide coupling means which, while fulfilling the above object, provides proper sealing between the pipes.

It is a still further object of this invention to provide coupling means which, while fulfilling the above object, are capable of proper coupling and sealing between pipes even with the pipes subjected to a rotational torque.

It is a still further object of this invention to provide coupling means which, while fulfilling the above objects, allows for a degree of linear or rotational misalignment between the pipes.

It is a still further object of this invention to provide coupling means which, while fulfilling the above objects, is extremely simple in design and effective in use.

Broadly stated, the coupling means for joining first and second generally tubular members comprise a first flange defining a circular outer periphery and fixed relative to the first generally tubular member adjacent one end thereof, and a second flange defining a circular outer periphery and fixed relative to the second generally tubular member adjacent one end thereof, the first and second generally tubular members being positionable to position the first and second flanges adjacent each other. Further included is an extended generally tubular portion extending from the first generally tubular portion and into the second generally tubular member with the first and second flanges so positioned adjacent each other. Annular seal means are disposed between the extended generally tubular portion and the second generally tubular member, and means are included for selectively securing the first and second flanges relatively together when so positioned adjacent each other.

BRIEF DESCRIPTION OF THE DRAWINGS

These and other objects of the present invention will become apparent from a study of the following specification and drawings, in which:

FIG. 1 is a perspective view of a mover unit associated with pipe means incorporating the invention.

FIG. 1A is a side elevation of a first embodiment of coupling means incorporating the invention;

FIG. 2 is a sectional elevation of the coupling means of FIG. 1;

FIG. 3 is an enlarged view of the area III-III of FIG. 2;

FIG. 4 is an end view of a portion of the coupling means of FIGS. 1A-3;

FIG. 5 is an enlarged elevation of a portion of the apparatus of FIG. 1A, but with the means for securing the coupling means removed therefrom;

FIG. 6 is a view similar to that shown in FIG. 5, but with the first and second pipes separated;

FIG. 7 is a perspective view, partially shown in phantom, which illustrates an alternate means for securing the coupling means together, with such alternate means in a securing position; and FIG. 8 is a view similar to that shown in FIG. 7, but with the alternate securing means in an open position.

DESCRIPTION OF THE PREFERRED EMBODIMENT

Shown in FIG. 1 is a wheeled mover unit 9 which may be selectively driven to rotate an irrigation line 11 made up of a plurality of pipe members 12, 14. Such irrigation line 11 is supported along its length by a plurality of spaced wheels 13 fixed thereto. The pipe members 12, 14 are coupled together by coupling means, a first embodiment of which is shown at 10. The line 11 is itself rotated about its longitudinal axis by the unit 9, to rotate the wheels 13. It will be understood that such coupling means 10 is subjected to torque when the irrigation line 11 acts as a drive axle for the wheels 13.

FIGS. 1A-6 show the first embodiment of coupling means 10 for joining the generally tubular pipe members 12, 14. The pipe 12 has associated therewith a sprinkler nozzle 16, as is well known. The tubular pipe 12 has fixed relative thereto as a part thereof an annular flange 18 which defines a circular outer periphery 20, such flange 18 being located adjacent one end of the pipe 12. The tubular pipe 14 likewise has fixed relative thereto as a part thereof an annular flange 22 which defines a circular outer periphery 24 of diameter substantially equal to the diameter of the circular outer periphery 20.

The surface 26 interconnecting the pipe 12 and the circular outer periphery 20 is frusto-conical in configuration, being tapered outwardly in the direction from the pipe 12 to the circular outer periphery 20. Such surface 26 is angled 6° from a plane perpendicular to the longitudinal axis 28 of the pipe. Likewise, the surface 30 interconnecting the pipe 14 and the circular outer periphery 24 is frustoconical in configuration, being tapered outwardly in the direction from the pipe 14 to the circular outer periphery 24. Such surface 30 is also angled 6° from a plane perpendicular to the longitudinal axis 32 of the pipe 14.

The end surface 34 of the flange 18 defines a plurality of projecting teeth 36 thereabout, equally spaced at intervals of 4°. Thus, ninety teeth 36 are defined thereon. The end surface 38 of the flange 22 likewise defines a plurality of projecting teeth 40 thereabout, equally spaced at intervals of 4°. Thus, ninety teeth 40 are also defined thereon. With the pipes 12, 14 positioned as shown in FIGS. 1A–6 the teeth 36 extend toward the flange 22, and the teeth 40 extend toward the flange 18. With the flanges 18, 22 positioned adjacent each other, the teeth 36 are brought into engagement with the teeth 40.

An extended generally tubular portion 42 extends from the pipe 14 as a part thereof, and with the flanges 18, 22 positioned adjacent each other, extends into the pipe 12. The pipe 12 defines on its inner surface an annular channel 44 into which is seated an annular seal 46, and with the flanges 18, 22 brought together, such seal 46 is disposed between the extended portion 42 and the pipe 12. Such seal 46 and associated structure may with advantage take the form shown in U.S. Pat. No. 2,620,206 (assigned to the assignee of this invention).

The flange 18 defines four substantially circular apertures 48 therethrough, such apertures 48 being spaced substantially 90° apart about the flange 18. The flange 22 defines four apertures 50 therethrough, such apertures 50 also being disposed substantially 90° apart about the flange 22. The apertures 50 are elongated generally along an arc having as its center the longitudinal axis 32 of the pipe 14. A plurality of bolts 52 are included, each being positionable through an aperture 48 defined by the flange 18 and an aperture 50 defined by the flange 22. A plurality of nuts 54 are included, each nut 54 being threadably engageable with a bolt 52 to draw the flanges 18, 22 together and so selectively secure them together. The apertures 50 are sufficiently elongated to allow a total of 8° in variation in rotational misalignment of one pipe relative to another, which means a difference of two teeth when measured about a flange. That is, one pipe can be rotationally misaligned by one tooth in either direction from a position wherein a bolt 52 would pass substantially through the center of an elongated aperture 50.

An alternate means for selectively securing the flanges 18, 22 together is shown in FIGS. 7 and 8. As shown therein, the flanges 18, 22 are positioned adjacent each other, and a split clamp 60 is positioned about the flanges 18, 22. An over-center catch 62 is utilized to draw the halves 64, 66 of the split clamp 60 together, and to encircle the flanges 18, 22. The surfaces 26, 30 interconnecting the pipes 12, 14 and the circular outer peripheries 20, 24 are angled in the manner previously described, so that the drawing together of the clamp halves 64, 66 acts on these angled surfaces 26, 30 to provide a strong and effective coupling of the pipes 12, 14.

In either embodiment, it is to be understood that, because of the particular design thereof, including the spaced apart teeth described above, the coupling means are capable of withstanding a relatively great torque load needed to advance the irrigation line, resisting the great stress placed thereon tending to uncouple such coupling means. Meanwhile, because of the particular placement of the seal means and the structure associated therewith, proper sealing between the pipes is maintained even with the coupling means subjected to such relatively great torque.

The embodiment of FIGS. 7 and 8 provides a very high degree of sealing between pipes 12, 14, without the necessity of the halves 64, 66 of the split clamp 60 being drawn together extremely tightly. Thus, the split clamp 60 may be relatively easily removed and applied when necessary.

Each sprinkler nozzle 16 has associated therewith a drain 68 for allowing the irrigation line 11 to substantially empty when such sprinkler nozzle 16 is not in use, as well known. Such drain 68 is generally positioned opposite the sprinkler nozzle 16 associated therewith, and for proper draining thereby, must be substantially directly downwardly positioned. However, the male-female connection and seal 46 described above allows draining of water past the seal 46 even if the conventional drain 68 is not positioned directly downwardly. The prior art system described above, wherein an annular seal is disposed between radial faces of connected pipe members, does not, of course, provide this advantage.

What is claimed is:

1. In an irrigation system including an irrigation line rotatable about the longitudinal axis thereof upon application of rotational torque thereto, and means connected to the line applying said rotative torque thereto, wherein said irrigation line comprises a plurality of generally tubular members, coupling means joining first and second generally tubular members of the irrigation line comprising: a first flange defining a circular outer periphery and fixed relative to the first generally tubular member adjacent one end thereof; a second flange defining a circular outer periphery and fixed relative to the second generally tubular member adjacent one end thereof, the first and second generally tubular members being positionable to position the first and second flanges adjacent each other; an extended generally tubular portion extending from the first generally tubular member and into the second generally tubular member with the first and second flanges so positioned adjacent each other; annular seal means disposed between the extended generally tubular portion and the second generally tubular member; and means on said first and second flanges selectively securing the same together when so positioned adjacent each other, said first flange defining a first plurality of projecting teeth, and said second flange defining a second plurality of projecting teeth, said first plurality of teeth being evenly spaced about said first flange and extending toward the second flange with the first and second flanges so positioned adjacent each other, the second plurality of teeth being evenly spaced about the second flange and extending toward the first flange with the first and second flanges so positioned adjacent each other, said first plurality of teeth being in meshing engagement with said second plurality of teeth with the first and second flanges so positioned adjacent each other, and wherein the means for selectively securing the first and second flanges relatively together comprises a plurality of bolts, each disposed through an aperture defined by one of the first and second flanges, and an aperture defined by the other of the first and second flanges, said apertures defined by the other of the first and second flanges being elongated generally along an arc having as its center the longitudinal axis of the generally tubular member to which said other of the first and second flanges is fixed, and a plurality of nuts, each threadably engaged with a bolt.

2. The coupling means of claim 1 wherein the projecting teeth on the first and second flanges are spaced at intervals of 4°.

3. The coupling means of claim 1 wherein the apertures are spaced substantially 90° apart on the first and second flanges.

4. The coupling means of claim 1 wherein a sprinkler head is connected to one of the tubular members.

5. In an irrigation system including an irrigation line rotatable about the longitudinal axis thereof upon application of rotational torque thereto, and means connected to the line applying said rotative torque thereto, wherein said irrigation line comprises a plurality of generally tubular members, coupling means joining first and second generally tubular members of the irrigation line comprising: a first flange defining a circular outer periphery and fixed relative to the first generally tubular member adjacent one end thereof; a second flange defining a circular outer periphery and fixed relative to the second generally tubular member adjacent one end thereof, the first and second generally tubular members being positionable to position the first and second flanges adjacent each other; an extended generally tubular portion extending from the first generally tubular member and into the second generally tubular member with the first and second flanges so positioned adjacent each other; annular seal means disposed between the extended generally tubular portion and the second generally tubular member; and means on said first and second flanges selectively securing the same together when so positioned adjacent each other, said first flange defining a first plurality of projecting teeth, and said second flange defining a second plurality of projecting teeth, said first plurality of teeth being evenly spaced about said first flange and extending toward the second flange with the first and second flanges so positioned adjacent each other, the second plurality of teeth being evenly spaced about the second flange and extending toward the first flange with the first and second flanges so positioned adjacent each other, said first plurality of teeth being in meshing engagement with said second plurality of teeth with the first and second flanges so positioned adjacent each other and wherein the said means on said first and second flanges for selectively securing the same relative to one another comprises removable clamp means configured to encircle the first and second flanges.

6. The coupling means of claim 5 wherein the projecting teeth on the first and second flanges are spaced at intervals of 4°.

7. The coupling means of claim 5 wherein the clamp means comprise two semicircular members pivoted at one end to each other with the free ends provided with releasable securing means thereon connecting the said free ends together.

8. The coupling means of claim 5 wherein a sprinkler head is connected to one of the tubular members.

* * * * *